(12) United States Patent
Feigel et al.

(10) Patent No.: US 8,414,089 B2
(45) Date of Patent: Apr. 9, 2013

(54) EXTERNALLY CONTROLLABLE ELECTROHYDRAULIC VEHICLE BRAKE SYSTEM

(75) Inventors: Hans-Jörg Feigel, Rosbach (DE); Dieter Dinkel, Schwalbach (DE)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 12/376,314

(22) PCT Filed: Aug. 10, 2007

(86) PCT No.: PCT/EP2007/058340
§ 371 (c)(1),
(2), (4) Date: Feb. 4, 2009

(87) PCT Pub. No.: WO2008/017726
PCT Pub. Date: Feb. 14, 2008

(65) Prior Publication Data
US 2010/0282549 A1 Nov. 11, 2010

(30) Foreign Application Priority Data

Aug. 10, 2006 (DE) .......................... 10 2006 037 621
Aug. 6, 2007 (DE) .......................... 10 2007 036 859

(51) Int. Cl.
*B60T 8/34* (2006.01)
(52) U.S. Cl. ................. 303/113.1; 303/115.1; 303/116.1
(58) Field of Classification Search ............... 303/113.1, 303/113.2, 155.1, 115.4, 115.5, 116.1, 116.2, 303/116.3, 116.4, 119.1, DIG. 3, DIG. 11
See application file for complete search history.

(56) References Cited

U.S. PATENT DOCUMENTS

| | | | |
|---|---|---|---|
| 5,123,716 A | 6/1992 | Willmann | |
| 5,183,317 A | 2/1993 | Gutzeit | |
| 5,217,284 A | 6/1993 | Willmann | |
| 5,342,120 A * | 8/1994 | Zimmer et al. | ............ 303/113.2 |
| 5,605,385 A * | 2/1997 | Zaviska et al. | ............ 303/116.2 |
| 5,769,509 A | 6/1998 | Feigel et al. | |
| 5,918,948 A | 7/1999 | Burgdorf et al. | |
| 5,924,775 A | 7/1999 | Steffes | |
| 6,120,111 A | 9/2000 | Sakai | |
| 6,142,583 A | 11/2000 | Steffes | |
| 6,213,570 B1 | 4/2001 | Gegalski et al. | |
| 6,543,859 B2 | 4/2003 | Sakamoto | |
| 6,851,763 B1 | 2/2005 | Feigel | |
| 7,296,861 B2 | 11/2007 | Ohlig et al. | |
| 7,347,509 B2 | 3/2008 | Lenz | |

FOREIGN PATENT DOCUMENTS

| | | |
|---|---|---|
| DE | 41 02 864 A1 | 11/1991 |
| DE | 40 20 450 A1 | 1/1992 |
| DE | 44 25 578 A1 | 1/1996 |
| DE | 196 13 903 A1 | 10/1997 |
| DE | 198 35 250 A1 | 2/1999 |
| DE | 197 44 317 A1 | 4/1999 |

(Continued)

*Primary Examiner* — Pamela Rodriguez
(74) *Attorney, Agent, or Firm* — RatnerPrestia

(57) ABSTRACT

An externally actuable electrohydraulic vehicle brake system including an externally actuable electrohydraulic vehicle system with slip control. In order to make available a brake system which permits highly dynamic pressure build-up processes without throttling effects in the suction path, in particular through a master cylinder, being adversely affected, it is proposed that the hydraulic pump be assigned means which permit the hydraulic pump additionally to drive a hydraulic charging device which is connected to an inlet of the hydraulic pump.

16 Claims, 11 Drawing Sheets

FOREIGN PATENT DOCUMENTS

| | | |
|---|---|---|
| DE | 102 09 984 A1 | 10/2002 |
| DE | 103 18 850 A1 | 11/2004 |
| DE | 103 24 246 A1 | 12/2004 |
| DE | 10 2004 014 171 A1 | 3/2006 |
| DE | 10 2004 049 088 A1 | 4/2006 |
| DE | 10 2005 002 433 A1 | 5/2006 |
| EP | 0 459 117 A1 | 12/1991 |
| EP | 1 334 894 A2 | 8/2003 |
| JP | 11-198786 | 7/1999 |
| WO | WO 94/25322 | 11/1994 |
| WO | WO 96/19369 | 6/1996 |
| WO | WO 01/07307 | 2/2001 |

* cited by examiner

EXTERNALLY CONTROLLABLE ELECTROHYDRAULIC VEHICLE BRAKE SYSTEM

CROSS REFERENCE TO RELATED APPLICATIONS

This application is the U.S. national phase application of PCT International Application No. PCT/EP2007/058340, filed Aug. 10, 2007, which claims priority to German Patent Application No. DE 102006037621.8, filed Aug. 10, 2006 and German Patent Application No. DE 102007036859.5, filed Aug. 6, 2007, the contents of such applications being incorporated by reference herein.

BACKGROUND OF THE INVENTION

1. Field of the Invention

The invention relates to an externally actuable electrohydraulic vehicle brake system with slip control.

2. Description of the Related Art

The invention relates to an externally actuable electrohydraulic vehicle brake system with slip control, comprising electrohydraulic means which contain an electronic control unit for operating friction brakes by means of an electronically controlled hydraulic unit with at least one hydraulic pump in order to permit distribution and/or control of braking portions, in particular as a function of a brake activation request, comprising means for expressing a brake activation request in the form of a man/machine interface, wherein the friction brakes are preferably organized into at least two independent brake circuits, and wherein the man/machine interface can generally be decoupled mechanically from the friction brakes (brake-by-wire).

In conventional externally actuable brake systems of the closed type there is always the requirement to permit a rapid pressure build-up or pressure pulse in certain wheel brakes under all operating conditions. These brake systems usually comprise what is referred to as a changeover valve which permits switching over in the suction path of a piston pump in such a way that the pressure medium can be sucked in from a container by a master cylinder in order to be fed in the direction of the desired wheel brake. In this context, a large number of proposals for avoiding a throttling effect of the master cylinder owing to constrictions in the suction path have already been made. The effect of such measures, which are usually of a local structural nature, in the interior of a master cylinder is relatively limited.

SUMMARY OF THE INVENTION

The invention relates to a brake system which permits highly dynamic pressure build-up processes without adverse effects as a result of the throttling effect of a master cylinder as well as usually long intake paths. In particular, the low temperature behavior when the pressure medium is viscous is to be improved.

A further requirement is that the vehicle brake system harmonizes, where possible, with the arrangements which can be implemented differently in the drive train of hybrid vehicles, and nevertheless permits an acceptable activation characteristic as well as an acceptable level of comfort for a reasonable amount of expenditure. Emphasis is also to be placed in particular on not only permitting a high pressure but also a high volume flow to be output very quickly for applications in vehicles with a high volume capacity (heavy passenger vehicles).

The invention comprises essentially the fact that the hydraulic pump is firstly assigned means which permit it additionally to drive a hydraulic charging device which is connected to an inlet of the hydraulic pump. Since, in order to feed the friction brakes, the pump supplies a partial volume flow for feeding the charging device, it is possible to dispense with a separate pre-charging pump without actually having to dispense with the desired pre-charging effect. Consequently, the charging device can, as it were, be considered to be an independent pressure medium reservoir which is however included.

The charging device is embodied and dimensioned in such a way that it is capable of essentially making available the entire intake volume for the pump when the brake system is actuated externally. In other words, there is no need for the master cylinder with the container to be a component of the suction path of the pump, so that the latter can be completely separate. As a result, constrictions in the master cylinder do not have any adverse effect whatsoever on the intake processes under low temperature conditions, and the length of the suction path is also advantageously reduced.

The explanation is made essentially with reference to what is referred to as a black/white apportionment in which the friction brakes of a driven axle are separated from the friction brakes of a non-driven axle by means of the brake circuits.

In a further refinement of the invention there is provision for the means to have at least one branch which is arranged downstream of an outlet of the hydraulic pump, and preferably a control valve for regulating a charging function. While the branch permits a volume flow to be branched off in order to feed the pre-charging device, the control valve does not contribute to the metering of the pre-charging effect.

In another advantageous refinement of the invention, the charging device is embodied as a piston/cylinder unit with an inlet e and with an outlet a. As a result, an accelerated build-up of pressure is made possible with a comparatively small number of simple components. Additional pump assemblies with independent or at least enhanced drive such as are proposed for a premium range are basically not necessary.

In one particularly preferred embodiment of the invention there is provision that a piston, displaceably arranged in a sealed fashion in a housing, of the piston/cylinder unit separates a control chamber from a supply chamber, and that the supply chamber is connected to the inlet E of the hydraulic pump. Since a partial flow of the hydraulic pump acts on the control chamber, the piston is displaced in such a way that a volume of pressure medium is expelled from the supply chamber.

The vehicle brake system advantageously has a further branch which serves to connect the supply chamber of the piston/cylinder unit to the wheel brakes or the master cylinder by bypassing the hydraulic pump. This measure makes it possible to allow the piston/cylinder unit to act directly on the friction brakes. It is appropriate to feedback pressure medium in the direction of the master cylinder in order, for example, to correct a volume balance. In this context, it is also appropriate if the branch has on each side a pair of control valves comprising valves which are open in the currentless state, in order to determine the direction of delivery of the piston/cylinder unit. The branch is in any case basically located between the outlet a of the piston/cylinder unit and the inlet E of the hydraulic pump.

In one particular modified variant, which can be provided with or without additional low pressure accumulators, it is made possible that pressure medium which is discharged from the friction brakes can be fed back to the supply chamber via a corresponding hydraulic connection, so that the supply chamber is always reversibly filled with pressure medium through pressure discharge processes.

The preferred embodiments have the particular advantage that the supply chamber makes possible a pressure medium reservoir for supplying pressure medium, in particular to pre-charge the hydraulic pump, and that a suction path of the hydraulic pump ends in the supply chamber, after closure by an isolating valve. Since the piston/cylinder unit does not have to be a compulsory component of the master cylinder but rather can be arranged in or on a receptacle body of the hydraulic pump, particularly short intake paths are produced, which additionally assists the dynamics in the build-up of pressure.

The piston is advantageously embodied as a stepped piston with two piston faces in such a way that the pressure which is fed into the control chamber on the pump side acts on the control chamber via a first piston face. A second piston face of the piston acts on the pressure medium in the supply chamber. Furthermore there is provision that the second piston face is embodied so as to be larger than the first piston face. As a result of this measure an advantageous hydraulic transmission ratio, in the sense of a pressure/volume transducer, is utilized to a certain extent—within the limits of the law relating to volume constancy.

In principle an elastically prestressed compression spring continuously acts on the piston of the charging device so that the piston is continuously forced elastically in the direction of the control chamber. Of course, the spring stiffness of the compression spring is adjusted in such a way that although it assists the reversible filling process of the supply chamber it does not significantly impede charging processes.

In one particularly preferred variant of the invention, a charging device is used which contains an integrated low pressure accumulator volume, so that only one module has to be provided for the two functions.

In order to harmonize with motor vehicles which have an electrical/regenerative braking device, there is advantageously provision for the hydraulic pump to act, with the charging device, on the friction brakes of a circuit, which friction brakes are associated with a non-driven axle of a motor vehicle with a hybrid drive. Likewise it is conceivable for each wheel brake of an axle to have, respectively separated from one another, a pump and a charging device.

In an expanded refinement of the invention there is provision that each circuit has a pump with a charging device and that the means for expressing a braking request have a simulator. Such modifications relate essentially to brake systems without a vacuum brake booster.

If at least one other adjacent brake circuit is operated in a conventional fashion, that is to say not in the by-wire mode, this has the advantage that the driver of the vehicle is consequently provided with the desired activation characteristic through mechanical feedback. As a result of this partial hydraulic intervention, an activation simulator, such as is obligatory in what are referred to as EHB systems, is obsolete, and it is possible to operate with a correspondingly adapted master cylinder.

These and other aspects of the invention are illustrated in detail by way of the embodiments and are described with respect to the embodiments in the following, making reference to the Figures.

BRIEF DESCRIPTION OF THE DRAWINGS

The invention is best understood from the following detailed description when read in connection with the accompanying drawing. Included in the drawing are the following figures.

DETAILED DESCRIPTION OF THE PREFERRED EMBODIMENTS

Figure 1:
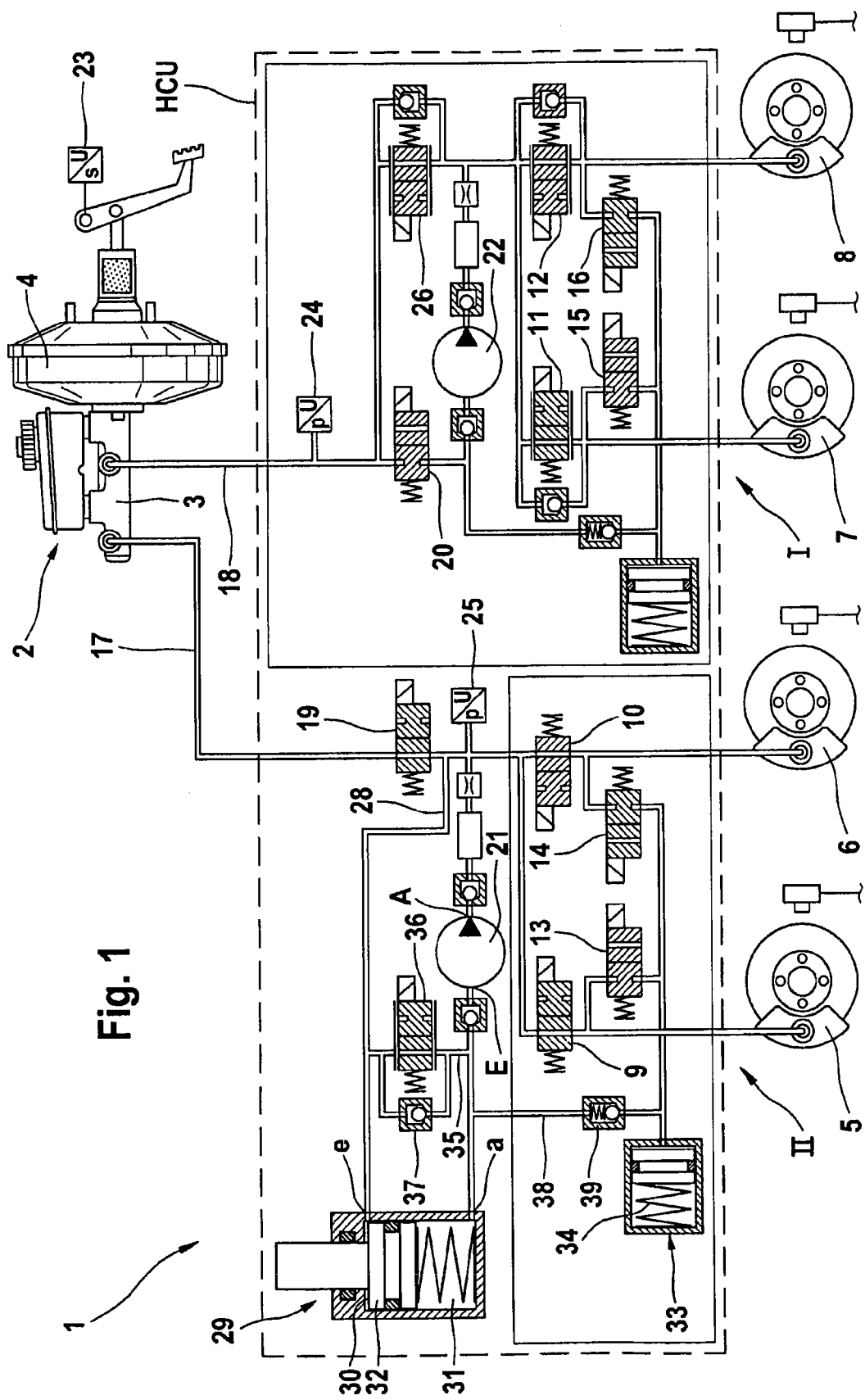
FIG. 1 shows a basic circuit diagram of a brake system with a hydraulic charging device in the rear axle circuit.

The figures largely represent basic circuit diagrams of vehicle brake systems. The respective motor vehicle brake systems 1 serve, in particular, for use in combination with drive trains which can be used in a regenerative fashion and which contain at least one driven axle at which the kinetic energy is, at least to a certain degree, buffered in a reversible fashion or directly re-used. As a result, these systems differ decisively from conventional drive trains at which there is exclusively irreversible conversion of energy in the direction of kinetic energy. The vehicle brake systems 1 used permit, by electronic means, averaging to be carried out between regeneratively/reversibly converted braking energy on the one hand and irreversibly, mechanically converted braking energy on the other hand. However, the invention is not provided exclusively for this purpose, with the result that application in conventionally driven motor vehicles is also possible.

However, when the brake system is used regeneratively it usually contains, in addition to further components which are to be assigned mainly to the drive train, an electric machine (not represented individually) in the form of a generator which can be used to convert kinetic energy into electrical energy in the braking mode in order, for example, to charge a drive battery. It is equally possible to conceive of a completely different electrical accumulator which is capable of storing unnecessary kinetic energy in the form of potential energy, such as for example a flywheel accumulator, a hydraulic charging device with a hydraulic accumulator or the like. In this context, in the first instance the detailed structural design of the drive train is completely irrelevant.

Furthermore, the brake system contains a man/machine interface such as, for example, a braking device 2 comprising a master cylinder 3 with brake fluid container and brake booster 4. Unless stated otherwise, the braking device 2 conveys a suitable brake activation sensation to the driver of the vehicle. This is done, for example, in that at least one brake circuit I of the system permits hydraulic-mechanical intervention in friction brakes, which intervention conveys the desired brake activation sensation to the driver of the vehicle. In contrast, the other brake circuit II, which relates to the driven axle, decouples as it were and is controlled according to by-wire principles. If the hydraulic-mechanical intervention does not occur for all the brake circuits in the normal operating mode (see FIGS. 3, 6), a simulator 40 is used which conveys the desired pedal sensation to the driver of the vehicle.

FIGS. 3 and 6-8 show braking devices 2 without a pneumatic brake booster 4 because in these cases hydraulic boosters in the widest sense are used. Depending on the vehicle wheel, at least one hydraulic friction brake 5 is provided which is organized jointly together with at least one other friction brake 6 in a brake circuit II, and wherein an inlet valve 9-12 which is open in the currentless state and generally an outlet valve 13-16 which is closed in the currentless state is respectively connected upstream of each of the friction brakes 5-8. Each circuit I, II has, in a hydraulic connection 17, 18 between the master cylinder 3 and friction brakes 5, 8, an isolating valve 19, 20 which is open in the currentless state and permits both disconnection of the hydraulic connection 17, 18 and direct hydraulic-mechanical intervention in the friction brakes 5-8 in the currentless emergency state. There is of course one wheel speed sensor per vehicle wheel.

The hydraulic friction brakes 5-8 are advantageously combined in brake circuit combinations which are either predefined or individually adaptable. Together with a hydraulic pump 21, 22 and together with the isolating valves 19, 20 which are open in the currentless state, and if appropriate by using a changeover valve 26 for varying the suction path, an autonomous build-up of pressure is made possible for controlling the driving stability, for controlling inter-vehicle distance, for stopping assistance or for similar electronically initiated added value functions. Further functions are, for example, a universally known antilock brake control system and traction control system.

In the section which follows, details will be given of the particular features, also in terms of the functional behavior, of a brake system 1 according to FIG. 1 which is based on what is referred to as a black/white brake circuit apportionment of the friction brakes 5-8.

A pedal angle sensor or travel sensor 23 senses a braking request at the brake device 2 or at the pedal system connected to it. In parallel with this, the hydraulic pressure which is desired on the driver's side is continuously measured using a pressure sensor 24 in a conventionally activated (non-driven) front axle circuit I. A further pressure sensor 25 can be provided in the rear axle brake circuit II downstream of the isolating valve 19 and entirely generally in each case individually in the region of all the friction brakes 5-8 in order determine in situ the applied braking pressure so that in total six pressure sensors can be provided in a complete expansion stage. The brake pressure for the friction brakes 5, 6 of the driven rear axle is determined from the described variables (pedal angle, pressure in the master cylinder 3) which brake pressure always takes into account, when necessary, a currently regeneratively usable braking portion at the rear axle. In response to the determined brake pressure, the isolating valve 19 between the master cylinder 3 and friction brake 5, 6 is moved into the closed position for the rear axle circuit II, with the result that the driver of the vehicle is completely decoupled in this regard from the hydraulic reactions. As a result, the activation comfort is decisively increased because the driver of the vehicle is provided exclusively with a reaction from the mechanical-hydraulic intervention in the friction brakes 7, 8 by the circuit I, while any other control processes or pulsations by the circuit II do not produce any uncomfortably perceptible, mechanical-hydraulic reactions. Strictly speaking, the brake-by-wire principle is applied only at the circuit II which relates to the driven axle, while the circuit I is quite intentionally operated in a conventional fashion with hydraulic reactions. This skillfully avoids additional costs for a separate simulator 40. As a result, the expenditure on hardware is lowered by virtue of the fact that uncomfortable reactions are reduced, and at the same time it becomes possible to take into account regenerative braking torques.

The build-up of pressure at the rear axle circuit II occurs electrohydraulically, as it were solely by means of the hydraulic pump 21 and, if appropriate, by taking into account regeneratively usable braking portions. For this purpose, a branch 28, which leads to a suction-side inlet E of the hydraulic pump, is located downstream of the isolating valve 19 in the direction of the friction brakes 5, 6. The outlet A of this hydraulic pump 21 leads to at least one of the friction brakes 5, 6 via the inlet valves 9, 10 described above. The hydraulic pump 21 operates essentially simultaneously with the closing of the isolating valve 19, in order to initiate the build-up of pressure at the desired friction brake. So that the build-up of pressure can take place in a highly dynamic fashion, a charging device 29 is connected upstream of the inlet E of the hydraulic pump 21. The charging device 29 is embodied as a piston/cylinder assembly and has two chambers, specifically an inlet-side control chamber 30 and an outlet-side supply chamber 31 which are separated from one another by a movable, spring-prestressed piston 32. While the outlet of the pump 21 mainly acts on the control chamber 30, the supply chamber 31 empties into the inlet E of the pump. The size of the supply chamber 31 is dimensioned in such a way that it can essentially always make available pressure medium, at least to a small extent, even if a low pressure accumulator 33 and the friction brakes 5, 6 are filled to a maximum extent. The piston 32 is stepped and has two faces of different sizes, wherein the smaller face is provided on the control chamber side and the larger face is provided on the supply chamber side. An elastically prestressed compression spring 44 counteracts the second (larger) face and holds the piston 32 continuously in the state of rest in an end position in which the supply chamber 31 is filled with pressure medium. Furthermore, a bypass 35 is provided which permits a disconnectable hydraulic connection between an inlet e and an outlet a of the charging device 29. For this purpose, a control valve 36 which is open in the currentless state is provided in the bypass 35, the blocked position of which control valve 36 is provided with a non-return valve 37 which opens in the direction of the control chamber 30.

In a further difference from known brake systems, a hydraulic connection 38, in which a non-return valve 39 which opens in the direction of the supply chamber 31 is arranged, is provided between the low pressure accumulator 33 and the outlet a or the supply chamber 31 of the charging device 29. This prevents the supply chamber 31 being easily able to empty into the low pressure accumulator 33 which has a relatively weak spring action.

The front axle circuit I has line routing and a configuration such as correspond essentially to conventional ESP circuits, so that in this regard no particular hardware technical features need to be described. The operating methods correspond to previously known externally actuable vehicle brake systems.

The function of the described brake system for driver-initiated braking is as follows with respect to the rear axle. After a braking request has been sensed and the acquired movement signals and pressure signals have been processed in an electronic control unit (ECU), the isolating valve 19 and also the control valve 36 are moved into a blocking position. At the same time, the hydraulic pump 21 is driven in order to build up pressure. The supply chamber 31 of the charging device 29 acts on the inlet E of the pump 21 whose outlet A in turn acts on the relatively small surface of the piston 32. As a result, the desired pressure is very quickly built up and adjusted in the friction brakes 5, 6. When the pump 21 is running, the control valve 36 can be switched alternately. This makes it possible to operate the charging device 29, as it were, as a storage reservoir which can be regulated and which either absorbs or makes available pressure medium depending on the situation. In the course of control processes it is possible alternately to fill the supply chamber 31 or the control chamber 30 with more or less pressure medium depending on the peripheral conditions.

In all the figures, identical features are marked with the same reference signs, and where necessary are additionally marked with a particular figure characterizing symbol t, u, v, w, x, y, z.

Figure 2:
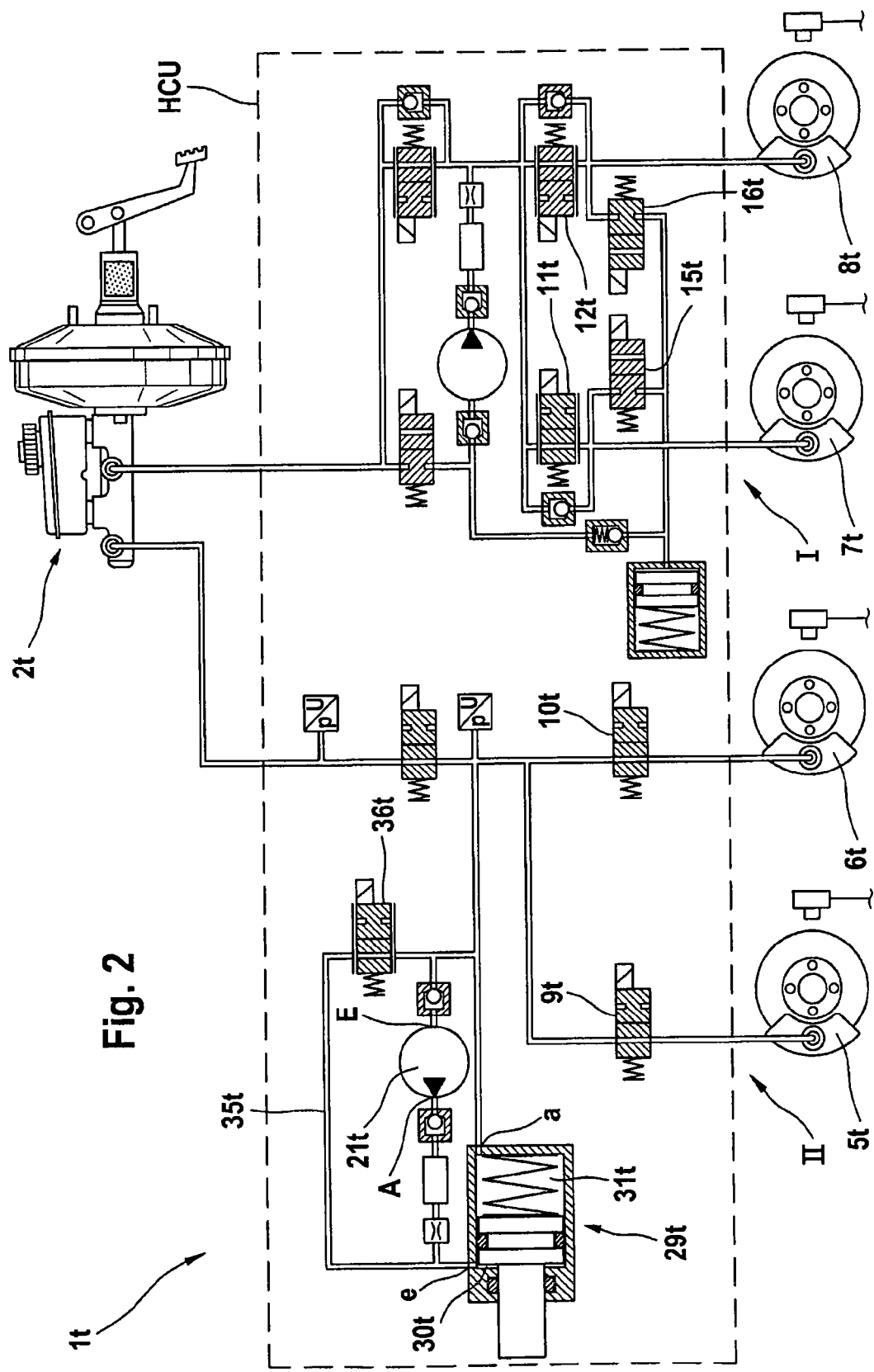
FIG. 2 shows a simplified embodiment of a brake system with a hydraulic charging device in a brake circuit.

FIG. 2 shows a highly simplified solution—likewise with circuit II for a driven rear axle—with a hydraulic charging device 29t which is switched in a somewhat modified way and which is basically based on a system as in FIG. 1. However, inlet valves 9t-12t which are open in the currentless state are provided exclusively in the wheel circuit brakes. In other words, savings are made by eliminating, compared to FIG. 1, outlet valves which are closed in the currentless state and also a separate low pressure accumulator 33 with a compression spring 34. In a further difference from FIG. 1, the hydraulic pump 21t acts with its outlet A on the inlet e of the hydraulic charging device 29t, the outlet a of which is in turn connected to the friction brakes 5t-8t. This measure hydraulically translates, as it were, the effect of the hydraulic pump 21t in order to act on the friction brakes 5t-8t. Furthermore, a bypass 35t, into which a control valve 36t which is open in the currentless state is inserted, is provided between the inlet E of the hydraulic pump 21t and inlet e of the charging device 29t. When the pump is running, the control valve 36t is closed in order to prevent the intake from the control chamber 30t of the charging device 29t. The configuration in the brake circuit of the front axle I corresponds to a conventional ESP device. In this context, not only are the inlet valves 11t, 12t which are open in the currentless state provided, but also the outlet valves 15t, 16t which are closed in the currentless state.

The pressure control in the region of the friction brakes 5t, 6t of the rear axle is carried out by means of what is referred to as multiplexing. In this context, parallel/simultaneous pressure control at a plurality of friction brakes 5t, 6t is not made possible but rather the pressure control at the friction brakes 5t, 6t occurs very quickly in chronological succession, wherein an increase in pressure at the friction brake 5t, 6t which is respectively to be controlled is respectively brought about by feeding using the hydraulic pump 21t and the charging device 29t. In other words, the same pressure source is successively connected to various consumers. Subsequent to the feeding of a friction brake 5t, 6t, the applied pressure is enclosed by closing the inlet valve 9t, 10t. Pressure-maintaining processes are easily carried out by further closing of the inlet valves 9t, 10t, with the result that the pressure which is present is, as it were, shut in. A reduction in pressure is brought about by opening the inlet valve 9t, 10t and the control valve 36t in the bypass 35t, with the result that the desired volume in the supply chamber 31t can be absorbed by the charging device 29t. As a result of this measure, the charging device 29t also in the process performs the function of a conventional low pressure accumulator 33t, as is apparent in the conventionally operated brake circuit I. The essential factor now is that the volume of the chambers 30t, 31t is essentially dimensioned in such a way that the necessary absorption volume is always kept available.

Figure 3:
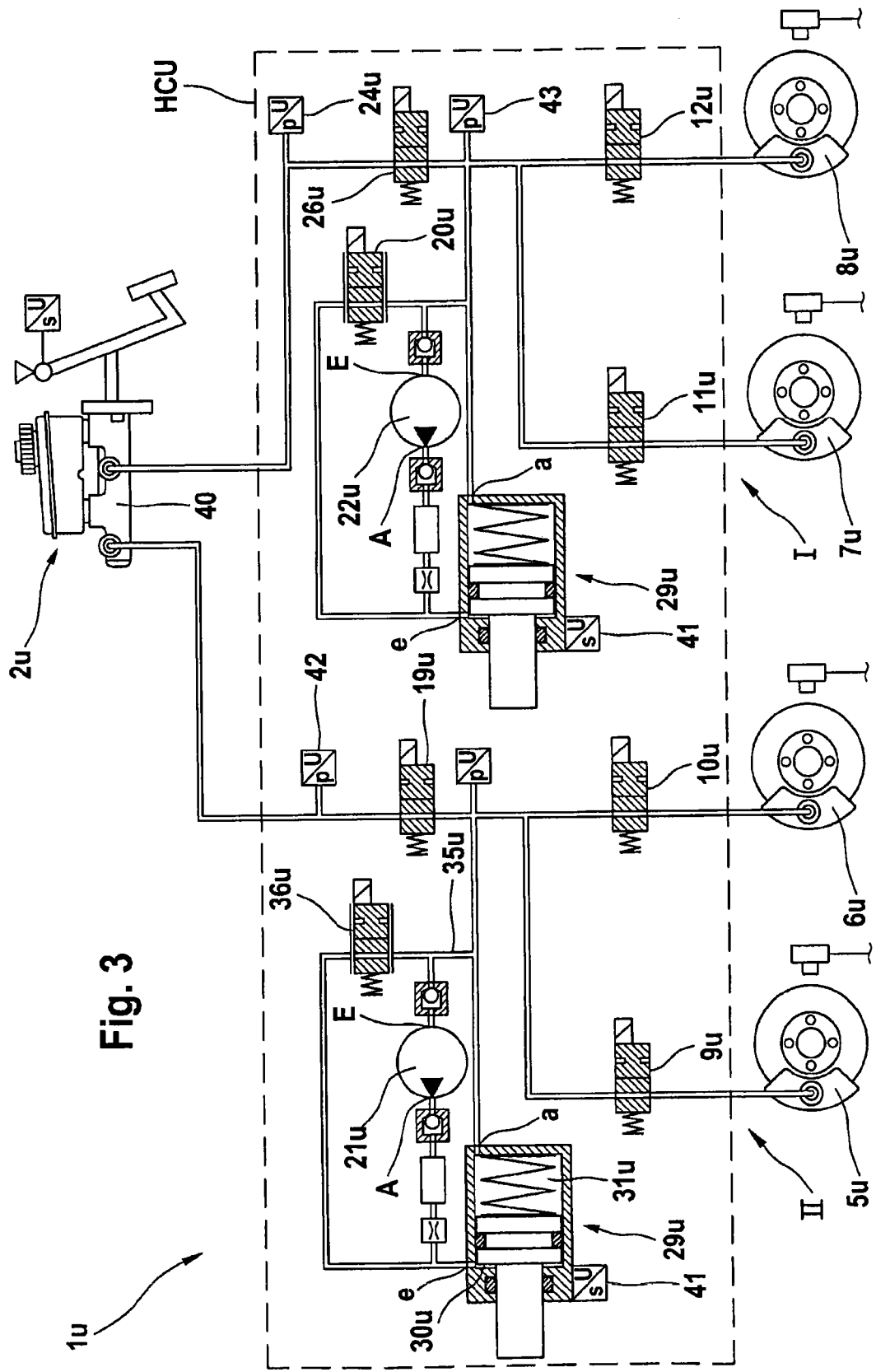
FIG. 3 shows a modified embodiment of a brake system according to FIG. 2 with hydraulic charging devices in two brake circuits and an additional travel sensor system.

The embodiment according to FIG. 3 corresponds to the embodiment according to FIG. 2 in terms of the configuration for the driven rear axle. Furthermore, the structure of the front axle circuit I is identical to the structure of the rear axle circuit II. The braking device 2 dispenses with a pneumatic brake booster and has a simulator 40 instead. In a further modification compared to other embodiments, each charging device 29u is equipped with a travel sensor 41, with the result that the absorption volume present in the control chamber 30u and also the supply volume present in the supply chamber 31u are measured directly and passed on for further processing to the electronic control unit. Otherwise, the design and the multiplexing operating method corresponds to those in FIG. 2.

Figure 4:
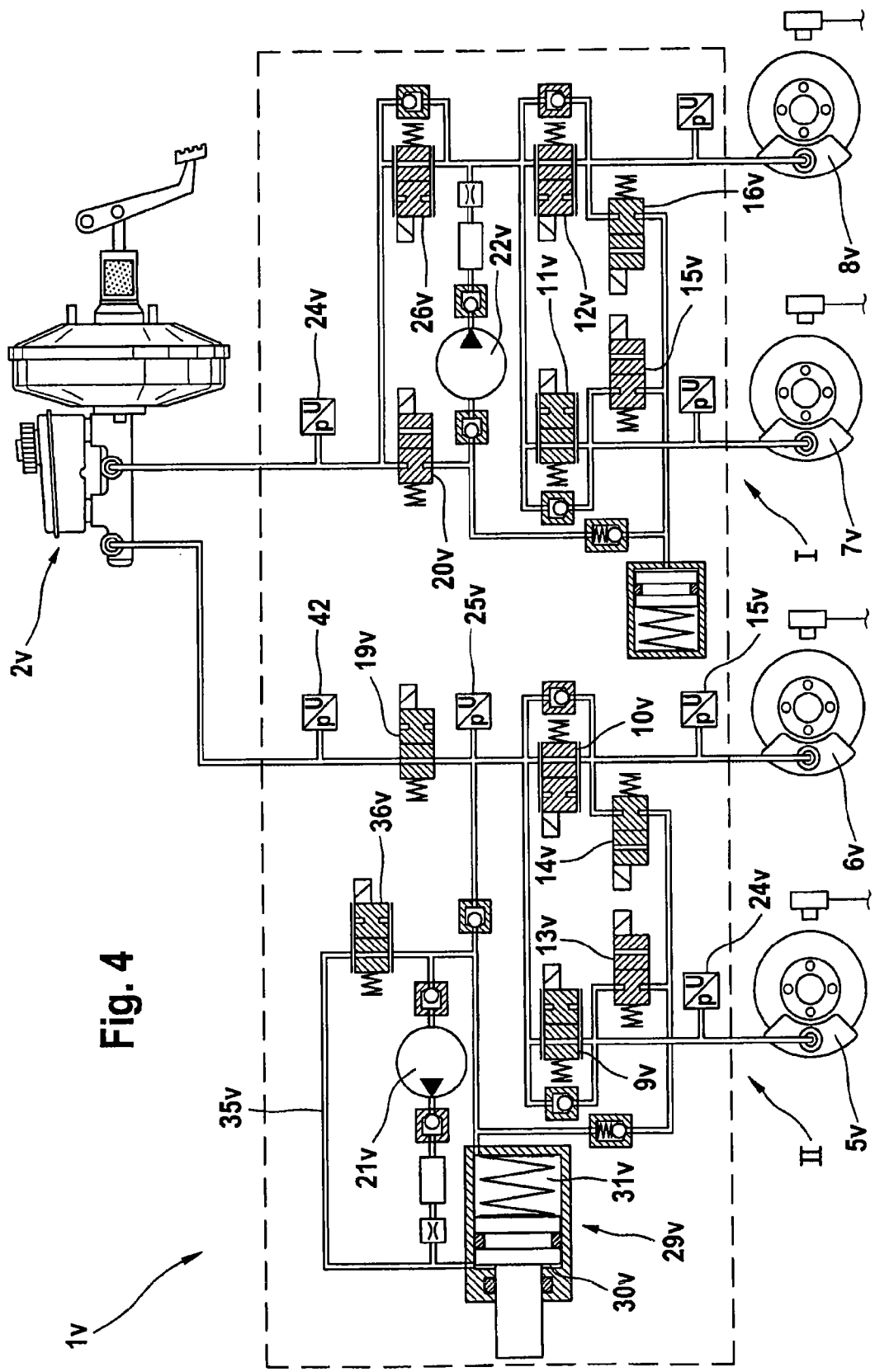
FIG. 4 shows a modified embodiment of a brake system according to FIG. 2 with inlet and outlet valves upstream of the friction brakes.

The embodiment according to FIG. 4 corresponds in large parts to the embodiment according to FIG. 2, with a charging device 29v for the hydraulic pump 21v being provided exclusively in the circuit II of the rear axle. However, all the friction brakes 5v-8v have inlet valves and outlet valves 9v-12v; 13v-16v as well as pressure sensors 24v, 25v. The front axle circuit is kept essentially in a conventional ESP configuration. Furthermore, the control principle of multiplexing is backed away from. Excessive pressure medium can be discharged into the control chamber 30v by opening the control valve 36v in the bypass 35v.

The embodiment according to FIG. 5 relates again to a multiplexing variant, that is to say to a brake system without outlet valves which are closed in the currentless state, and with a staggered pressure control. The pressure control in the friction brakes 5w-8w takes place in a serially successive fashion. However, according to FIG. 2 the control valve 36t is located between the outlet A of the pump 21t and the wheel brakes 5-8t, said control valve 36t being connected, in the arrangement according to FIG. 5, into a connection between the outlet a and inlet e of the charging device 29. The other circuit (not driven) is conventionally embodied so as to correspond to a customary ESP system, as in FIG. 2.

Figure 5:
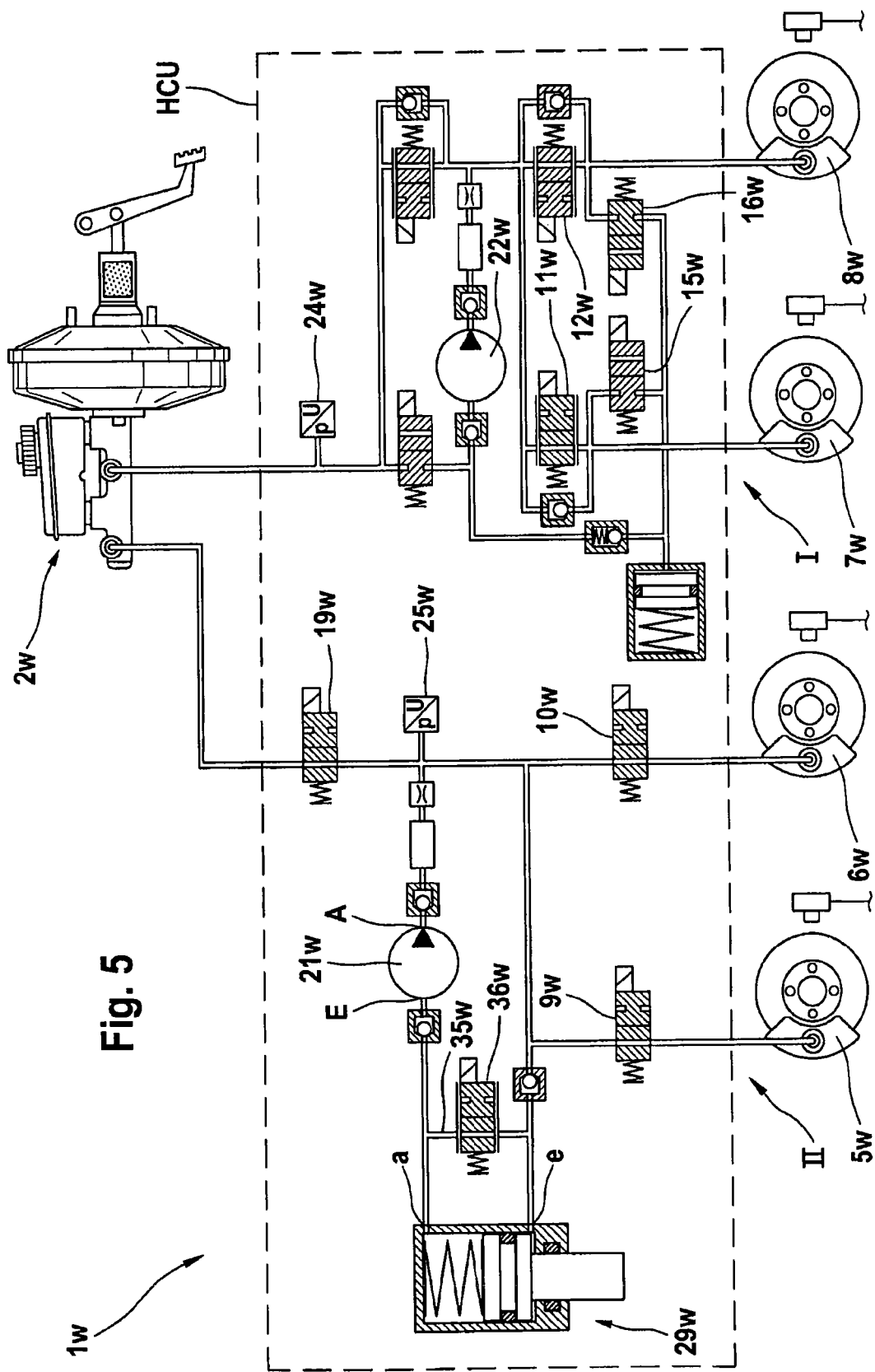
FIG. 5 shows a variant with multiplexing which is comparable to FIG. 2, wherein a charging device is provided in the circuit of the driven axle and acts on the inlet of the pump.
Figure 6:
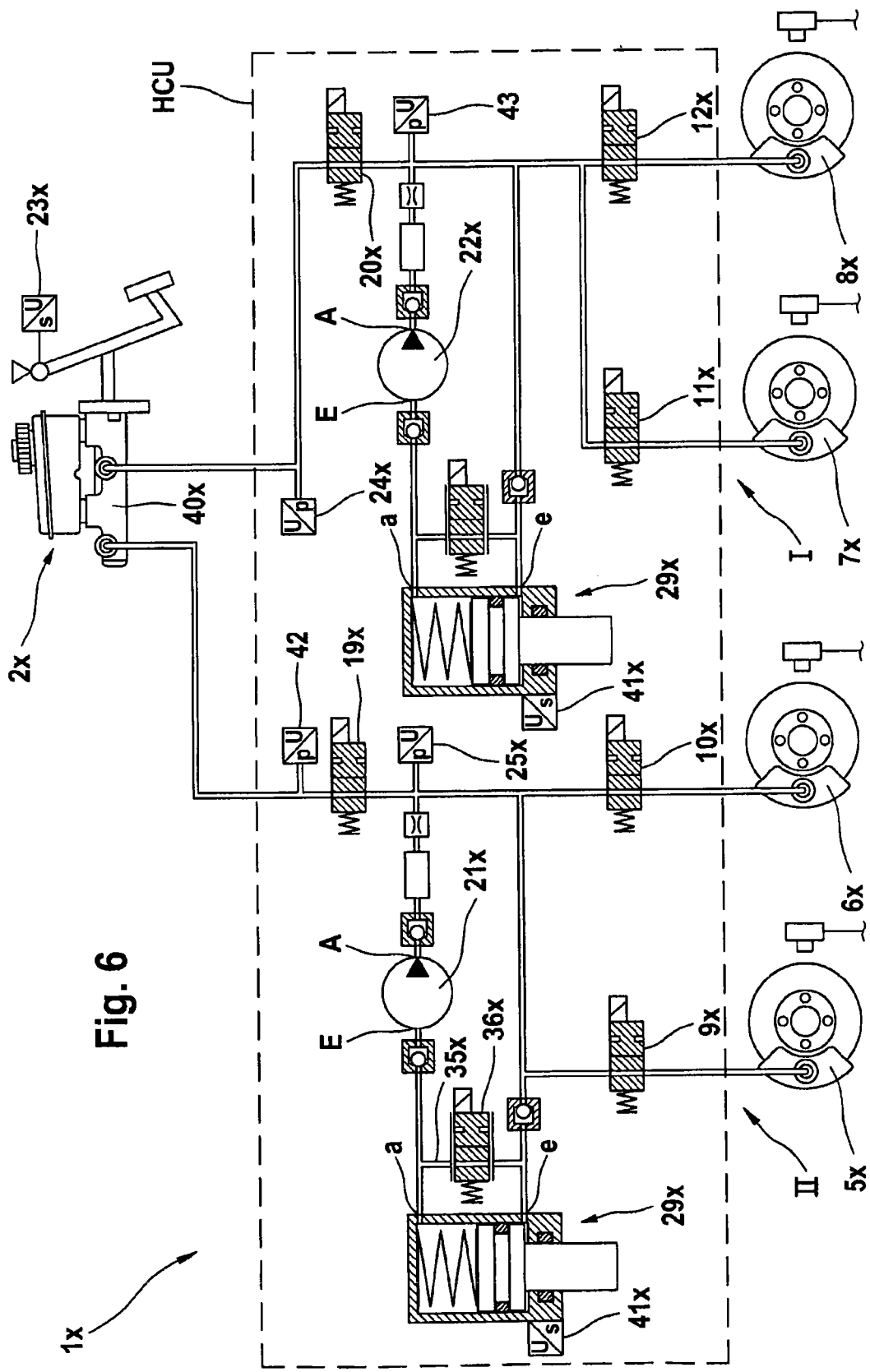
FIG. 6 shows a variant with multiplexing which is comparable to FIG. 3, wherein a charging device is provided in each circuit and acts on the inlet of the pump.

FIG. 6 corresponds essentially to FIG. 5. However, both circuits I, II are identical and have independent charging devices 29x which additionally have independent travel sensors 41x. This makes it possible also to include the filling level of the charging devices 29x in the pressure control. A feature which can generally be provided in all the exemplary embodiments. Because both circuits I, II are operated, as it were, by-wire with disconnection of the master cylinder 3x, the possibility of conveying a specific reaction from the brake system to the driver of the vehicle is not available here. For these reasons, the master cylinder 3x is provided with a separate simulator 40x. It is also to be added that in addition to the sensors 24x, 25x for both circuits I, II a separate pressure sensing means is intended on the basis of two pressure sensors 42, 43 which are provided independently of one another.

Figure 7:
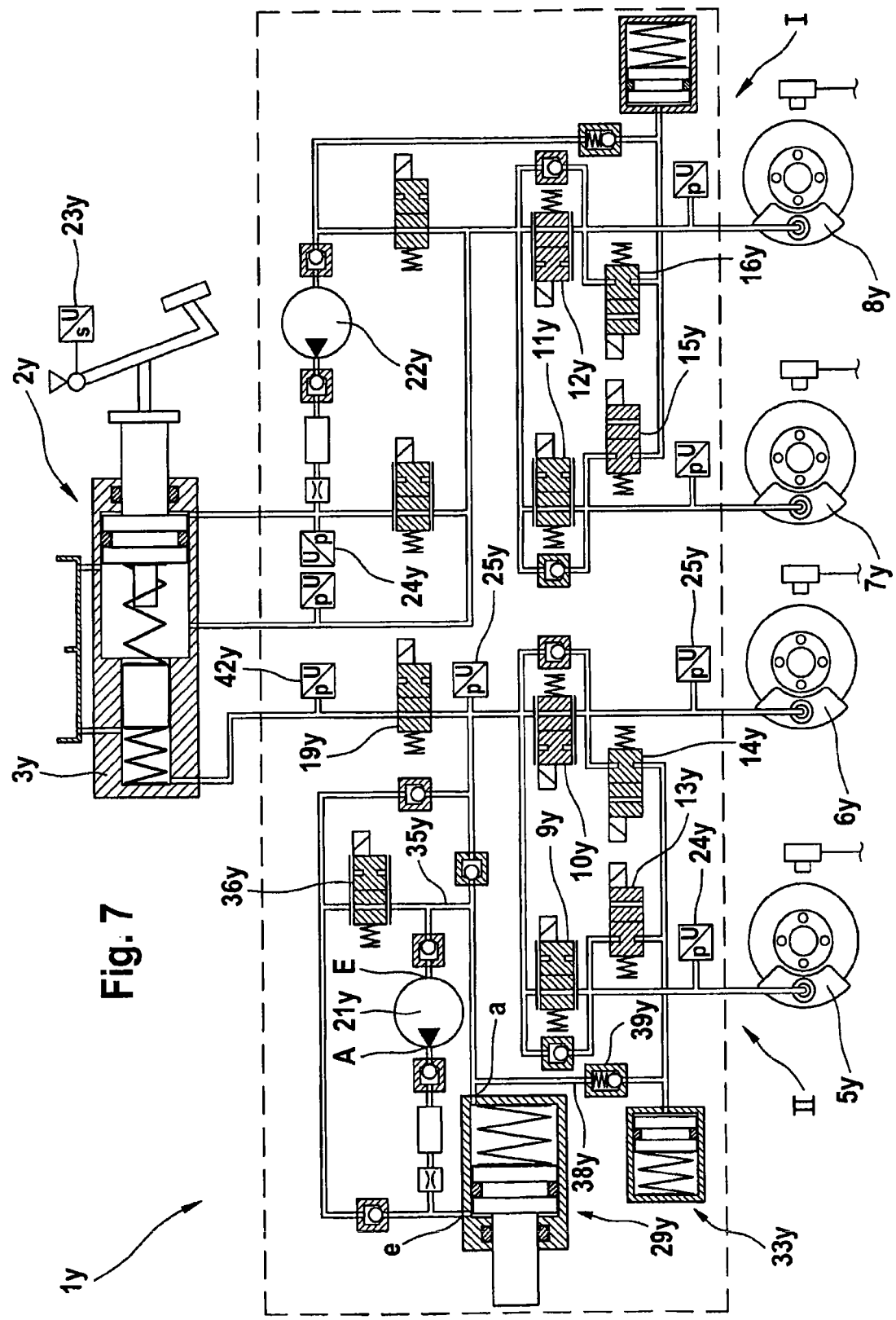
FIG. 7 shows an embodiment with a hydraulic booster which acts on a primary piston of a master brake cylinder, and with a charging device in the secondary circuit which relates to the driven axle wherein the outlet of the pump is connected to the inlet of the charging device.
Figure 8:
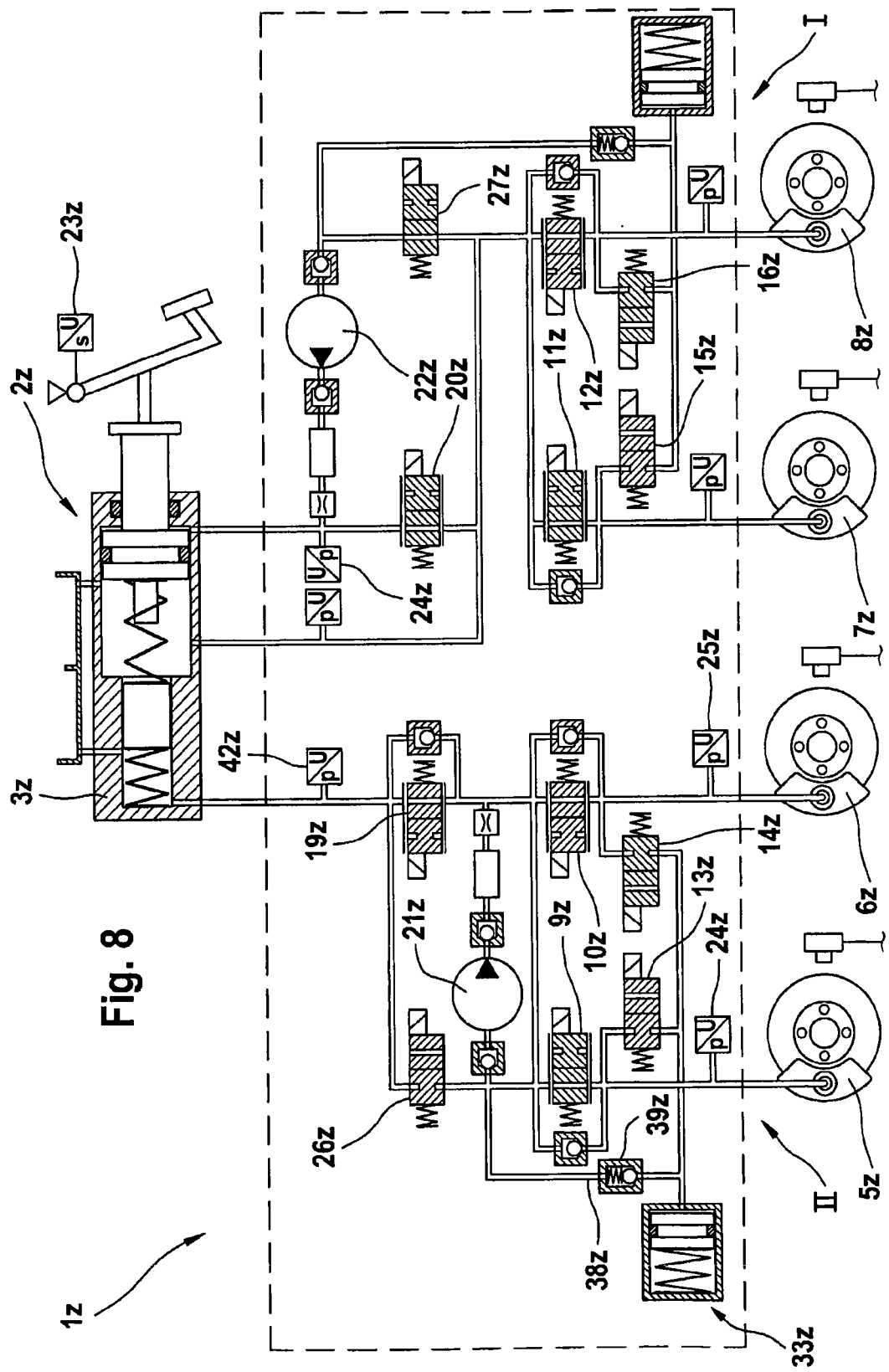
FIG. 8 shows an embodiment with a hydraulic booster which acts on a primary piston of a master brake cylinder, which is comparable to FIG. 7, but without a charging device.

FIGS. 7 and 8 illustrate variants which contain a hydraulic central booster, wherein the outlet of the pump 21y for at least one circuit II acts on a piston in the master cylinder 3y for the purpose of boosting. The braking device 2*y* is embodied as a separate master cylinder without a pneumatic booster. According to FIG. 7, the pump 21*y* acts with its outlet A on the inlet e of the charging device 29*y*, which in turn acts on friction brakes 5*y*, 6*y* of a driven (rear) axle. In contrast, the brake circuit of the front axle is embodied without a charging device and has a suction port or pressure port on the master cylinder 3*y*.

FIG. 8 describes a variant of a central booster which does not require a charging device at all. The configuration of the circuit I (primary circuit, non-driven front axle) is identical to FIG. 7. The circuit diagram of circuit II (secondary circuit, driven rear axle) corresponds essentially to the circuit diagram of a conventional ESP device in which isolating valve and changeover valve 19, 20*z*; 26, 27*z* are provided in order to adapt the suction path and delivery path of the pump 21*z*.

Figure 9:
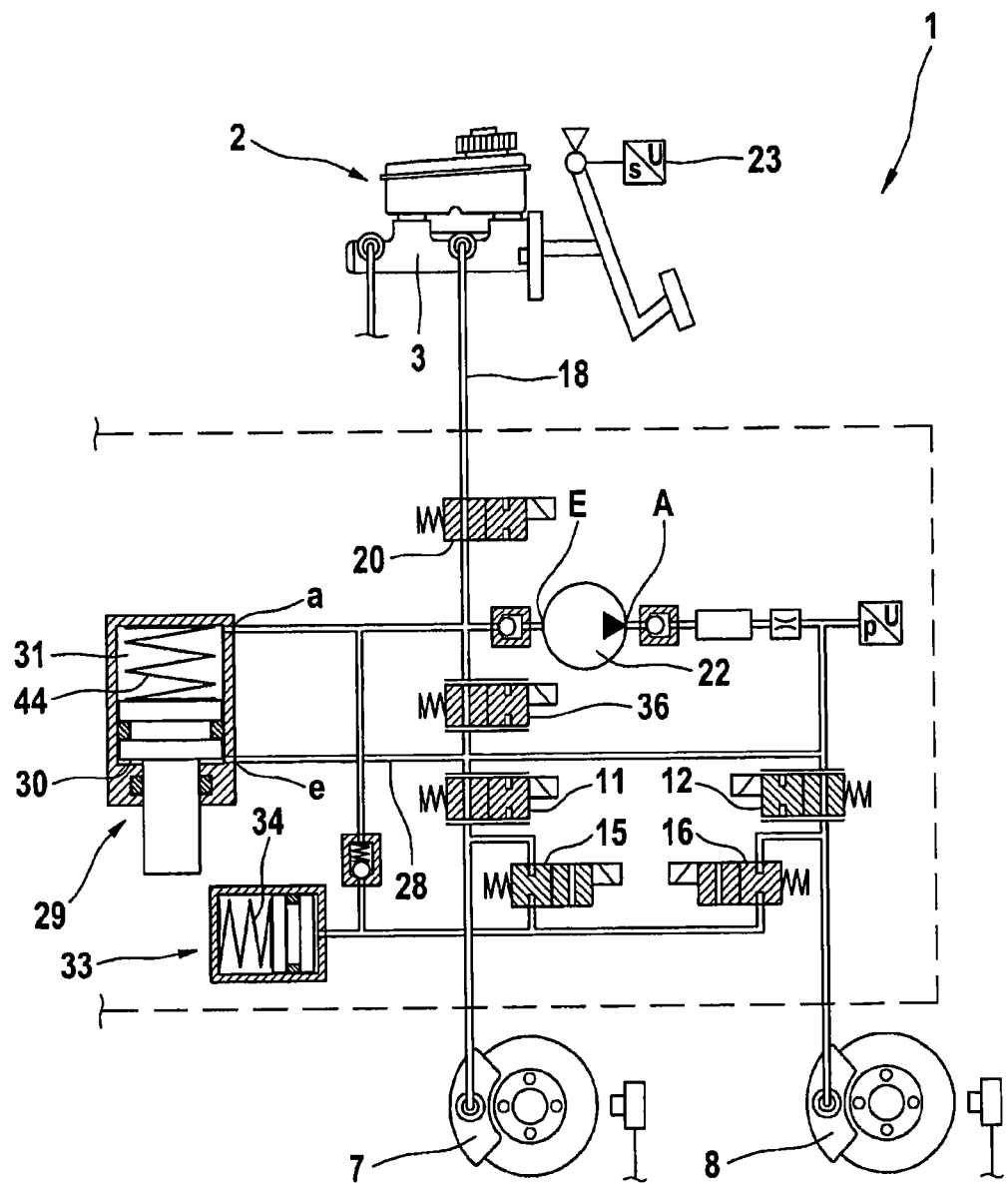
FIG. 9 shows a simplified embodiment which is comparable to FIG. 4 but without a pneumatic brake booster, wherein additional branches permit the supply chamber to be connected to the wheel brakes or the master cylinder by bypassing the pump, and with reversible filling of the supply chamber and additional absorption volume in a low pressure accumulator.

FIG. 9 shows a simplified embodiment which is comparable to FIG. 4 and in which just one circuit is illustrated. A pneumatic brake booster is replaced completely by a pressure source according to aspects of the invention, and a separate low pressure accumulator 33 is connected upstream of the supply chamber 31. The skilful configuration of the charging device 29 makes it possible to fill the supply chamber 31 if pressure medium is discharged from the friction brakes 5-8. Additional branches make it possible to connect the supply chamber 31 to the wheel brakes 5-8 or the master cylinder 3 by bypassing the pump 22. The isolating valve 20 and control valve 36 can be actively integrated into the control system.

Figure 10:
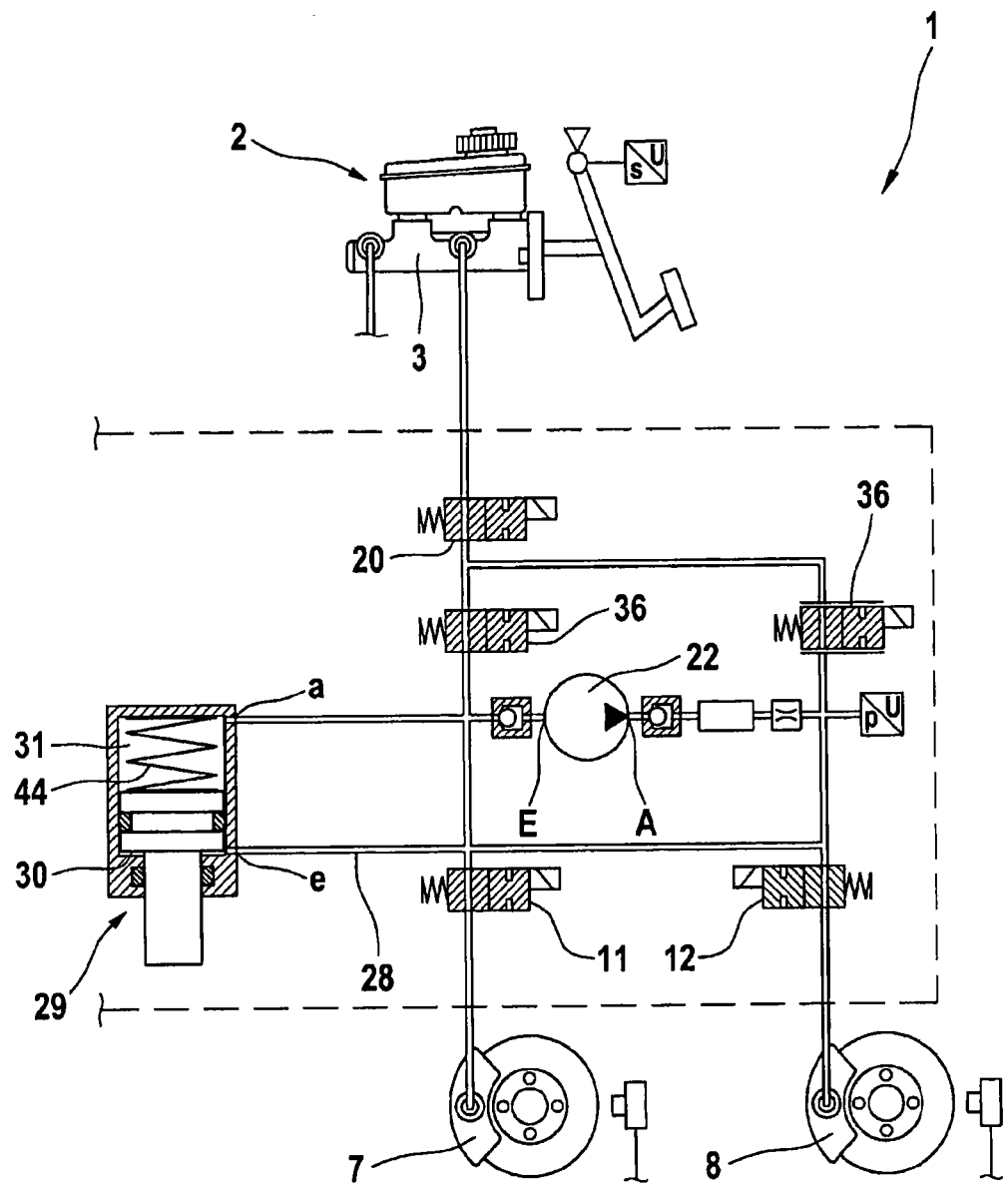
FIG. 10 shows an embodiment which is comparable to FIG. 9, but with a reduced number of valves for multiplexing.

FIG. 10 shows an embodiment which is comparable to FIG. 9 but only a reduced number of valves and also no low pressure accumulator are provided, in order to carry out the multiplexing already described.

Figure 11:
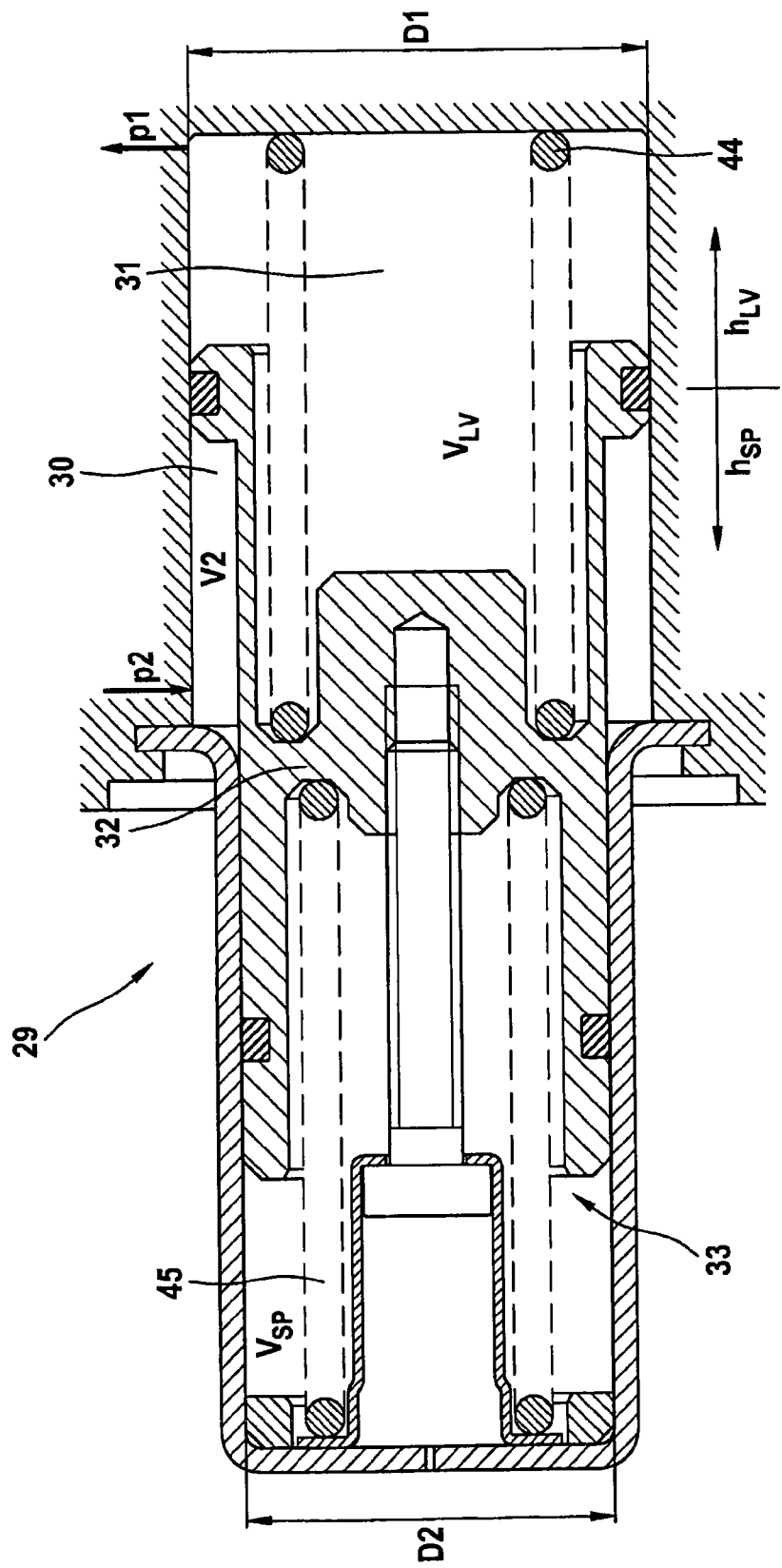
FIG. 11 shows a structural proposal for a charging device with an integrated low pressure accumulator in section on a relatively large scale.

FIG. 11 shows a design proposal for a charging device 29 with an integrated low pressure accumulator volume in section and on a relatively large scale. The piston 32 is arranged and guided in a movable fashion in a sheet metal housing and in a receptacle body (not illustrated in more detail) for the hydraulic pump 21, 22. The piston 32 is embodied as a stepped piston which acts on the pressure medium in the supply chamber 31 (volume VLV) with the piston face D1. The piston 32 separates the supply chamber 31 from the control chamber 20 (volume V2) to which the pressure p2 is applied by a delivery flow which is branched off on the pump side. The branched-off pressure p2 acts on a piston face which is reduced in comparison with the piston face D1. For the purpose of pre-charging, the piston 32 can carry out a pre-charging stroke hLV. In the opposite direction, the piston 32 can carry out a storage stroke hsp in order to carry out its low pressure storage function. It is to be added that a tied spring is arranged on the piston 32, which spring is used for providing axially elastic support on the sheet metal housing. The spring with the spring pot and tying element is located in an interior space Vsp which is connected to the ambient atmosphere (air). The compression spring 34 also acts on the piston 32, counter to the tied spring.

The described arrangements are preferably suitable for use with a regenerative braking device. The hybrid drive train which can be divided into different basic types is often referred to in conjunction with regenerative drive systems of passenger vehicles. In a serial hybrid system, exclusively an electric motor engages mechanically with driven wheels. An internal combustion engine is operated at an optimum operating point for a generator, and is used exclusively to generate electrical energy.

In what is referred to as a parallel hybrid system, two working machines, specifically an internal combustion engine and an electric motor, independently of one another can receive mechanical intervention in driven wheels by means of two clutches. In the regenerative operating mode (energy recovery mode), the clutch for the internal combustion engine is opened in order to prevent undesired drag torques of the internal combustion engine.

A serial/parallel hybrid system has two electric machines, one of which can be operated as a generator and the other of which can alternatively be operated as a generator or as a motor. The electric machine and the internal combustion engine which can be used in combination act on a planetary gear system which permits torque addition in the direction of the output and at the same time power splitting in the direction of the generator.

A two mode hybrid system combines a continuously variable transmission (CVT) with a 4 speed automatic transmission with fixed transmission ratios, an internal combustion engine and two electric machines in order to achieve a high level of energetic efficiency over the entire range of travel and speed. For these reasons, the electric drive is predominantly active in the lower speed range, while the internal combustion engine is dominant in the high speed ranges. The gear mechanisms are used for the connections between the two forms of drive.

In addition, there is also the through the road system. In order to avoid complex gear connections, the system has different forms of drive on one axle, for example an electrically regenerative front wheel drive in combination with a rear axle which is driven conventionally by an internal combustion engine. This makes it possible, for example, to predominantly use the electric drive of the front axle in the low speed range in order to change over in the high speed range to the conventional rear axle drive. The front axle is then used exclusively for regenerative braking torques.

As is apparent, there is a large range of variation between different drive train configurations, with different advantages and disadvantages. The wide variety in the drive train both gives rise to a requirement for comfortably seamless adaptation of a friction brake system and to a key problem of the present invention. In other words, the brake system has to be adapted to the different design variants of the hybrid technology with reliable and at the same time simple measures in such a way that a high level of brake activation comfort with the best possible utilization of energy is made possible.

While conventional brake systems permit exclusively irreversible conversion of kinetic energy to mechanical energy, the externally actuable vehicle systems in question are best suited for permitting both averaging between dynamic vehicle deceleration on the one hand and effective energy recovery on the other. This is because, depending on a necessary setpoint braking torque, the braking torque which is to be converted mechanically can be managed in such a way that it varies on a wheel specific basis, as a function of a braking torque which drops regeneratively as a result of a generator and as a function of the wheel contact forces which can be utilized. In this context it is necessary to bear in mind the fact that the braking torque which can be utilized regeneratively is dependent on the battery charge state, on the operating range and on the specific properties of the electric machine. The transition point between the braking operation with friction braking portion on the one hand and purely regenerative braking operation on the other should not be perceptible to the driver of the vehicle. While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. An externally actuable electrohydraulic vehicle brake system comprising:
   an electrohydraulic vehicle system with slip control,
   means for expressing a brake activation request in the form of a man/machine interface,
   friction brakes for converting kinetic energy, wherein the friction brakes are organized into at least two independent brake circuits, and
   an electronically controlled hydraulic unit for operating the friction brakes, said hydraulic unit having at least one hydraulic pump as a pressure source in order to permit distribution and/or control of friction braking portions as a function of either a brake activation request or an externally actuated braking intervention,
   wherein the man/machine interface is configured to be decoupled mechanically from the friction brakes,
   wherein the hydraulic pump is assigned means which permit the hydraulic pump to drive a hydraulic charging device which is connected to an inlet of the hydraulic pump for the purpose of pre-charging, and
   wherein the hydraulic charging device comprises i) a control chamber having an inlet that is in constant fluid communication with the hydraulic pump and ii) a supply chamber having an outlet that is in constant fluid communication with the hydraulic pump.

2. The brake system as claimed in claim 1, wherein the hydraulic pump drives the charging device in that an initial feed current is divided, and a separate part is fed to the charging device.

3. The brake system as claimed in claim 1, wherein the electronically controlled hydraulic unit includes at least one branch, which is arranged downstream of an outlet of the hydraulic pump and a control valve for regulating a charging function.

4. The brake system as claimed in claim 1, wherein the charging device is embodied as a piston/cylinder unit with an inlet and an outlet.

5. The brake system as claimed in claim 4, wherein a piston of the piston/cylinder unit is displaceably arranged in a housing and separates the control chamber from the supply chamber, and in that the supply chamber is connected to the inlet of the hydraulic pump.

6. The brake system as claimed in claim 5, wherein the electronically controlled hydraulic unit includes at least one branch, which is arranged downstream of an outlet of the hydraulic pump and a control valve for regulating a charging function, and
   wherein an additional branch is provided and is configured for connecting the supply chamber of the piston/cylinder unit to wheel brakes or a master cylinder by bypassing the hydraulic pump, and the additional branch is located between the outlet of the piston/cylinder unit and the inlet of the hydraulic pump.

7. The brake system as claimed in claim 5, wherein the supply chamber forms a variable pressure medium reservoir for supplying the hydraulic pump, and in that a suction path of the hydraulic pump ends in the supply chamber.

8. The brake system as claimed in claim 5 further comprising a connection provided between the outlet of the hydraulic pump and the control chamber.

9. The brake system as claimed in claim 5, wherein the piston is embodied as a stepped piston with two piston faces such that a pressure medium which is fed into the control chamber by the hydraulic pump acts on a first piston face.

10. The brake system as claimed in claim 9, wherein a second piston face acts on the pressure medium in the supply chamber, and wherein the second piston face is larger than the first piston face.

11. The brake system as claimed in claim 5 further comprising an elastically prestressed compression spring that continuously acts on the piston so that the piston is continuously forced elastically in a direction of the control chamber.

12. The brake system as claimed in claim 1, wherein the hydraulic pump acts with the charging device on the friction brakes of a circuit, which friction brakes are associated with a non-driven axle of a motor vehicle with a hybrid drive.

13. The brake system as claimed in claim 12, wherein each circuit has a pump with a charging device and in that the means for expressing a braking request include a simulator.

14. The brake system as claimed in claim 13, wherein each circuit also has a low pressure accumulator in addition to the charging device.

15. The brake system as claimed in claim 12, wherein each friction brake of an axle has, respectively separated from one another, a pump and a charging device.

16. The brake system as claimed in claim 15, wherein each charging device has an integrated low pressure accumulator volume, and in that a piston of each charging device is provided in a tied fashion.

* * * * *

UNITED STATES PATENT AND TRADEMARK OFFICE
CERTIFICATE OF CORRECTION

PATENT NO.         : 8,414,089 B2
APPLICATION NO.    : 12/376314
DATED              : April 9, 2013
INVENTOR(S)        : Feigel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 822 days.

Signed and Sealed this
Thirteenth Day of August, 2013

Teresa Stanek Rea
*Acting Director of the United States Patent and Trademark Office*